US008902756B2

(12) United States Patent
Nishida et al.

(10) Patent No.: US 8,902,756 B2
(45) Date of Patent: Dec. 2, 2014

(54) PACKET TRANSFER PROCESSING DEVICE, PACKET TRANSFER PROCESSING METHOD, AND PACKET TRANSFER PROCESSING PROGRAM

(75) Inventors: Yukikuni Nishida, Yokosuka (JP); Kenji Kawai, Yokosuka (JP); Keiichi Koike, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 190 days.

(21) Appl. No.: 13/575,062

(22) PCT Filed: Dec. 1, 2010

(86) PCT No.: PCT/JP2010/071460
§ 371 (c)(1),
(2), (4) Date: Jul. 25, 2012

(87) PCT Pub. No.: WO2011/096127
PCT Pub. Date: Aug. 11, 2011

(65) Prior Publication Data
US 2012/0294311 A1    Nov. 22, 2012

(30) Foreign Application Priority Data

Feb. 4, 2010    (JP) ................................. 2010-023251

(51) Int. Cl.
*H04L 12/26* (2006.01)
*H04L 12/741* (2013.01)
*H04L 12/54* (2013.01)

(52) U.S. Cl.
CPC .............. *H04L 12/56* (2013.01); *H04L 45/745* (2013.01)
USPC ......................................... 370/235; 370/231

(58) Field of Classification Search
CPC ......... H04L 7/10; H04L 49/90; H04L 49/901; H04L 49/9049; H04L 69/12; H04L 69/16; H04L 69/161; H04L 69/163; H04L 69/22; H04L 69/32; H04L 69/166; H04L 29/06; H04L 29/12009; H04L 29/12018; H04L 12/56; H04L 45/475; G06F 17/30206
USPC .................. 370/230, 231, 235, 236, 392–394, 370/395.3–395.32, 395.7–395.72; 709/229
See application file for complete search history.

(56) References Cited

U.S. PATENT DOCUMENTS 7,567,561 B2 *   7/2009   Toumura ....................... 370/389
7,738,465 B2 *   6/2010   Akahane et al. ........... 370/395.3
(Continued)

FOREIGN PATENT DOCUMENTS

CN            1791068 A       6/2006
JP        A-2007-166514      6/2007
(Continued)

OTHER PUBLICATIONS

International Search Report and Written Opinion of the ISA for PCT/JP, ISA/JP, mailed Dec. 28, 2010.
(Continued)

*Primary Examiner* — Thai Hoang
(74) *Attorney, Agent, or Firm* — Harness, Dickey & Pierce, P.L.C.

(57) ABSTRACT

The end of a communication period can be detected reliably and efficiently by a control unit and validity/invalidity of search rules in a search table can be effectively managed. A timer is provided so as to correspond to each entry area of the search table. Then, under control of a timer managing unit, the timer starts a counting operation whenever information is written in a validity management table or a packet in which a communication parameter matches a packet search condition corresponding to information on the validity management table that is set as valid is received. In addition, when a counting time of the timer exceeds a preset time-out time, information indicating the time-out is stored in a time-out management table.

15 Claims, 13 Drawing Sheets

(56) References Cited

U.S. PATENT DOCUMENTS

| | | | |
|---|---|---|---|
| 7,792,133 B2* | 9/2010 | Kamiya | 370/422 |
| 2003/0154297 A1* | 8/2003 | Suzuki et al. | 709/229 |
| 2003/0189932 A1* | 10/2003 | Ishikawa et al. | 370/392 |
| 2004/0167897 A1* | 8/2004 | Kuhlmann et al. | 707/10 |
| 2009/0092051 A1* | 4/2009 | Miyata | 370/236 |
| 2009/0316714 A1* | 12/2009 | Kodaka et al. | 370/412 |
| 2010/0228754 A1* | 9/2010 | Shimakura | 707/758 |
| 2011/0080830 A1* | 4/2011 | Ko et al. | 370/235 |

FOREIGN PATENT DOCUMENTS

| | | |
|---|---|---|
| JP | 2007-221240 A | 8/2007 |
| WO | WO2006/085374 A1 | 8/2006 |

OTHER PUBLICATIONS

Notice of Reasons for Rejection, Japanese Patent Application No. 2011-552665, May 28, 2013.

Office Action, Chinese Patent Application No. 201080062742.7, Jul. 4, 2014.

* cited by examiner

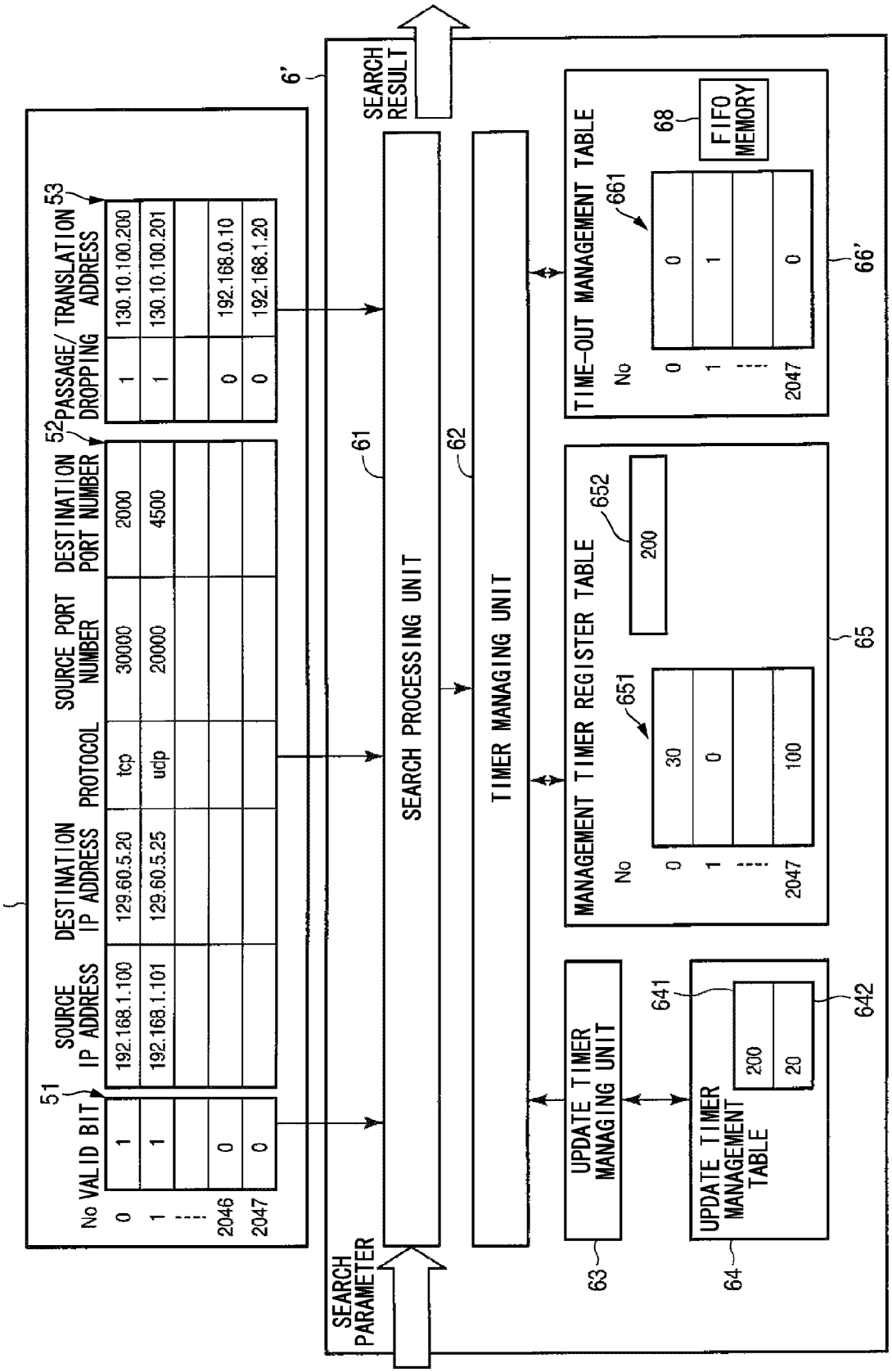

FIG. 7A

| No | IP ADDRESS 0 | IP ADDRESS 1 | IP ADDRESS 2 | IP ADDRESS 3 | PROTOCOL | PORT NUMBER 0 | PORT NUMBER 1 | PORT NUMBER 2 | PORT NUMBER 3 |
|---|---|---|---|---|---|---|---|---|---|
| 0 | 10.20.30.40 | 172.10.20.30 | 192.168.0.1 | 192.168.0.20 | tcp | 30000 | 2000 | 10000 | 15000 |
| 1 | 10.20.50.60 | 172.20.40.60 | 192.168.0.1 | 192.168.0.30 | udp | 20000 | 4500 | 750 | 10500 |
| ... | | | | | | | | | |
| 2046 | | | | | | | | | |
| 2047 | | | | | | | | | |

FIG. 7B

| No | IP ADDRESS 0 | IP ADDRESS 1 | IP ADDRESS 2 | PROTOCOL | PORT NUMBER 0 | PORT NUMBER 1 | PORT NUMBER 2 |
|---|---|---|---|---|---|---|---|
| 0 | 10.20.30.40 | 172.10.20.30 | 192.168.0.20 | tcp | 30000 | 2000 | 15000 |
| 1 | 10.20.50.60 | 172.20.40.60 | 192.168.0.30 | udp | 20000 | 4500 | 10500 |
| ... | | | | | | | |
| 2046 | | | | | | | |
| 2047 | | | | | | | |

FIG. 8

| No | IP ADDRESS 0 (32bit) | IP ADDRESS 1 (32bit) | IP ADDRESS 2 (32bit) | PORT NUMBER 0 (16bit) | PORT NUMBER 1 (16bit) | PORT NUMBER 2 (16bit) | PROTOCOL (8bit) |
|---|---|---|---|---|---|---|---|
| 0 | 10.20.30.40 | 172.10.20.30 | 192.168.0.20 | 30000 | 2000 | 15000 | tcp |
| 1 | 10.20.50.60 | 172.20.40.60 | 192.168.0.30 | 20000 | 4500 | 10500 | udp |
| ---- | | | | | | | |
| 2046 | | | | | | | |
| 2047 | | | | | | | |

⇒

| No | IP ADDRESS 0 (32bit) | IP ADDRESS 1 (32bit) | IP ADDRESS 2 (32bit) | PORT NUMBER 0 (16bit) | PORT NUMBER 1 (16bit) | PORT NUMBER 2 (16bit) | PROTOCOL (8bit) |
|---|---|---|---|---|---|---|---|
| 0 | SOURCE IPv6 ADDRESS | | | | | 15000 | tcp |
| 1 | DESTINATION IPv6 ADDRESS | | | | | 10500 | tcp |
| ---- | | | | | | | |
| 2046 | | | | | | | |
| 2047 | | | | | | | |

PACKET TRANSFER PROCESSING DEVICE, PACKET TRANSFER PROCESSING METHOD, AND PACKET TRANSFER PROCESSING PROGRAM

CROSS-REFERENCE TO RELATED APPLICATIONS

This application is a 371 U.S. National Stage of International Application No. PCT/JP2010/071460, filed Dec. 1, 2010. This application claims priority to Japanese Patent Application No. 2010-023251, filed Feb. 4, 2010. The disclosures of the above applications are incorporated herein by reference.

TECHNICAL FIELD

The present invention relates to a packet transfer processing device, a packet transfer processing method, and a packet transfer processing program that perform transfer processing of packets using a packet filtering function, such as a router used in an Internet protocol (IP) network.

Priority is claimed on Japanese Patent Application No. 2010-023251, filed on Feb. 4, 2010, the content of which is incorporated herein by reference.

BACKGROUND ART

In recent years, with the spread of IP networks as exemplified by the Internet, there have been many cases in which local area networks (LANs) are constructed in companies and homes, the LANs are connected to wide area networks through the Internet or the like, and packets are transferred. However, if a terminal accommodated in a LAN is connected to the external network, there is a risk that secret information such as privacy information is leaked or tampered due to unauthorized access from the external network, and thus guaranteeing the security in the LAN becomes an important topic.

Therefore, conventionally, a packet transfer processing device such as a router that relays and transfers packets between the LAN and the external network is configured to have a packet filtering function. The packet filtering function is a function of comparing receiving packets with preset filtering rules and determining whether or not the packets are permitted to pass. The filtering rules are defined by communication parameters used in transferring the packets, for example, a source address, a destination address, a protocol, a source port number, and a destination port number.

By the way, in order to achieve the packet filtering function, a very large number of filtering rules need to be stored as search rules in a search table; however, there is a limitation in the storage capacity of the search table. Therefore, in order to decrease the number of entries of the search rules stored in the search table, for example, the following device is suggested.

That is, when packets are normally dropped and only the necessary packets are passed, search rules do not need to be valid at all times and it is sufficient that they are valid during communication periods. Therefore, a valid flag that shows validity/invalidity of each of the search rules is prepared for each of the search rules stored in the search table. Then, when a central processing unit (CPU) sets a search rule in the search table at the time of starting the communication, the corresponding valid flag is set to "1" and the search rule is validated. On the other hand, when the communication ends, the valid flag is reset to "0" such that the search rule is not used thereafter, in order to prepare for addition of a next search rule. In this state, when new communication starts, the search rule corresponding to the valid flag that is set to "0", that is, an invalid entry, is searched for and a new search rule is set in the search table, instead of the search rule that is not used. Therefore, contents of the entries of the search table are dynamically changed and a larger number of packets can be searched with a smaller memory area.

As a specific search circuit, there is a circuit that uses a plurality of rule comparing units in parallel and compares communication parameters of a received packet with filtering rules. If the circuit receives the packet, the circuit distributes and sends the communication parameters of the received packet to rule comparing units whose processing has ended, among the plurality of rule comparing units. In addition, whenever the circuit reads one filtering rule from the search table, the circuit supplies this filtering rule to all the rule comparing units. Whenever the communication parameters of the received packet are input, each rule comparing unit compares the communication parameters with all the filtering rules sequentially read from the search table. Then, if a filtering rule matching the communication parameter is detected, this filtering rule is output as the search result. It is to be noted that if a plurality of filtering rules matching the communication parameters are detected, the filtering rule having the highest priority is output as the search result (for example, refer to Patent Document 1).

PRIOR ART DOCUMENT

Patent Document

Patent Document 1: Japanese Unexamined Patent Application, First Publication No. 2007-166514

SUMMARY OF INVENTION

Problems to be solved by the Invention

However, if the CPU has a 32-bit architecture, only 32 entry areas of the search table can be examined at one time when an empty area of the search table is searched for. Because the number of entry areas of the search table is large as, for example, 2048, a large number of processing steps and a long time are still necessary when the CPU searches for the empty area of the search table.

Furthermore, the CPU needs to determine whether or not the communication has ended in order to invalidate the corresponding search rule after the communication ends. However, in general, a packet transfer block, which operates independently of the CPU, determines whether the packets can be transferred during a communication period after the search rules are set in the search table. For this reason, the packets are not transferred to the CPU during the communication period, and the CPU cannot detect that the communication period has ended.

The present invention has been made in view of the above-described circumstances and an object thereof is to provide a packet transfer processing device, a packet transfer processing method, and a packet transfer processing program that can reliably and efficiently detect the end of a communication period by a control unit, thereby making it possible to effectively manage validity/invalidity of search rules in a search table, and to more effectively utilize limited entry areas of the search table.

Means for Solving the Problems

In order to achieve the above-described object, one aspect of the present invention is a packet transfer processing device that includes: a search table that includes a plurality of entry areas to store a plurality of packet search conditions; a search processing unit that, whenever a packet is received, compares a communication parameter of the received packet with the plurality of packet search conditions stored in the search table and outputs a search result corresponding to a packet search condition matching the communication parameter; a transfer processing unit that executes processing for transferring or dropping the received packet based on the search result; a validity management table that stores information for setting whether each packet search condition is valid or invalid, in association with each of the plurality of packet search conditions stored in the search table; timers that correspond to the plurality of entry areas; a timer managing unit that starts a counting operation by a timer whenever a packet in which a communication parameter matches a packet search condition corresponding to information on the validity management table that is set as valid is received or whenever the information is written in the validity management table; a time-out management table that stores information indicating whether the timer is performing the counting operation or times out, for each timer; a validity/invalidity managing unit that stores information indicating that the timer times out in the time-out management table and changes information corresponding to the timed-out timer among the information stored in the validity management table from validity to invalidity if a counting time of the timer exceeds a preset time-out time; and a control unit that, when the communication starts, detects an empty entry area of the search table based on the information stored in the time-out management table and stores a packet search condition needed to perform the communication in the detected empty entry area.

Therefore, in accordance with the present invention, with respect to each of the packet search conditions that are set as valid, if the timer times out because a packet satisfying the packet search condition is not received for a constant period or more, the information indicating the time-out is stored in the time-out management table. For this reason, when the communication starts, the control unit can detect the empty entry area in the search table based on the information stored in the time-out management table and can store a new search condition in the detected empty entry area.

That is, even when the control unit does not participate in packet transfer processing during the communication period, the control unit can recognize the empty entry area in the search table and can dynamically manage the entries of the packet search conditions in the search table. Thereby, use efficiency of the entry areas of the search table is improved and the memory capacity of the search table can be decreased.

Moreover, the present invention may include the following aspects.

In a first aspect, the time-out management table includes: a time-out register that includes a plurality of bit areas that are provided to correspond to the entry areas of the search table and stores bit data indicating whether the timer is performing the counting operation or times out in a bit area corresponding to the timer among the plurality of bit areas; a plurality of OR circuits that are provided to correspond to a plurality of groups obtained by dividing the plurality of bit areas of the time-out register and output OR data of the bit data stored in the plurality of bit areas included in each group; and a plurality of aggregation registers that are provided to correspond to a plurality of blocks obtained by dividing the plurality of OR circuits by the number of bits which can be simultaneously processed by a processor of the control unit and store OR data output from OR circuits included in each block, and in detecting the empty entry area, the control unit selects a block including a bit indicating that the timer times out based on the OR data stored in the aggregation registers, selects a group including a position of the bit indicating that the timer times out from the position of the bit indicating that the timer times out in the selected block, reads bit data from the bit areas of the time-out register belonging to the selected group, and detects an entry area corresponding to the timed-out timer based on the read bit data.

By this configuration, in detecting the empty entry area, first, the group including the timed-out entry area is selected based on the OR data stored in the aggregation register. Next, the empty entry area is identified based on the bit data of the bit areas belonging to the selected group. That is, refinement in identifying the empty area is performed in two steps. Therefore, as compared with the case in which validity/invalidity is determined sequentially with respect to all the entry areas of the search table, processing steps and a processing time that are needed to identify the empty entry area can be greatly decreased.

In a second aspect, a memory that sequentially stores identification information of an entry area of the search table corresponding to the timed-out timer if the timer times out is further included, and, in detecting the empty entry area, the control unit reads the identification information of the entry area of an earlier storage order from the memory and sets the entry area indicated by the read identification information as the empty entry area.

By this configuration, whenever the packet search condition is invalidated, the identification information indicating the entry area storing the packet search condition is sequentially stored in the memory, and thus the control unit can easily identify the empty entry area by searching the memory. Therefore, it is possible to identify the empty entry area in a short time with a smaller number of processing steps, without searching the entry areas of the search table and the bit areas of the time-out register.

In a third aspect, packets are transferred between a first interface and a second interface, each of the packet search conditions stored in the search table includes a first search condition, a second search condition, and a third search condition, if the received packet is a first packet received by the first interface, the search processing unit compares a communication parameter of the first packet with a set of the first search condition and the third search condition and outputs the search result if the communication parameter of the first packet matches the set of the first search condition and the third search condition, and if the received packet is a second packet received by the second interface, the search processing unit compares a communication parameter of the second packet with a set of the second search condition and the third search condition and outputs the search result if the communication parameter of the second packet matches the set of the second search condition and the third search condition.

Thereby, when the packet is received by the first interface, the search result is output if the communication parameter of the received packet matches the set of the first search condition and the third search condition. In addition, when the packet is received by the second interface, the search result is output if the communication parameter of the received packet matches the set of the second search condition and the third search condition. As a result, the search table can be searched by the bidirectional search. Therefore, the entry areas of the search table can be decreased and the memory capacity of the search table can be decreased.

In a fourth aspect, if the received packet is the first packet, the search processing unit outputs the second search condition as a translated communication parameter obtained by performing a network address port translation on the first packet, and if the received packet is the second packet, the search processing unit outputs the first search condition as a translated communication parameter obtained by performing the network address port translation on the second packet.

Thereby, when the packet is received by the first interface, the second search condition is output as the translated communication parameter by the network address port translation. In addition, when the packet is received by the second interface, the first search condition is output as the translated communication parameter by the network address port translation. Therefore, the network address port translation can be achieved without increasing the number of entry areas of the search table and increasing the packet search conditions stored in the entry areas of the search table.

In a fifth aspect, packets are transferred between a first interface and a second interface, each of the packet search conditions stored in the search table includes a first search condition, a second search condition, and a third search condition, and irrespective of whether the received packet is received by the first interface or by the second interface, the search processing unit compares a communication parameter of the received packet with a set of the first search condition and the third search condition, compares the communication parameter of the received packet with a set of the second search condition and the third search condition, and outputs the search result if the communication parameter matches the set of the first search condition and the third search condition or if the communication parameter matches the set of the second search condition and the third search condition.

Thereby, the search result is output if the communication parameter of the received packet matches the set of the first search condition and the third search condition or if the communication parameter of the received packet matches the set of the second search condition and the third search condition. As a result, the search table can be searched by the bidirectional search without determining the interface by which the packet is received. Therefore, the entry areas of the search table can be decreased and the memory capacity of the search table can be decreased. Moreover, as compared with the case in which the search table is searched depending on the interface by which the packet is received, the number of packet search conditions can be decreased to ½. Therefore, it is particularly effective in the case in which the number of needed packet search conditions is large.

In a sixth aspect, if the communication parameter of the received packet matches the set of the first search condition and the third search condition, the search processing unit outputs the second search condition as a translated communication parameter obtained by performing a network address port translation on the received packet, and if the communication parameter matches the set of the second search condition and the third search condition, the search processing unit outputs the first search condition as the translated communication parameter.

Thereby, if the communication parameter matches the set of the first search condition and the third search condition, the second search condition is output as the translated communication parameter by the network address port translation. In addition, if the communication parameter matches the set of the second search condition and the third search condition, the first search condition is output as the translated communication parameter. Therefore, the network address port translation can be achieved without increasing the number of entry areas of the search table and increasing the packet search conditions stored in the entry areas of the search table.

In a seventh aspect, in the search table, each of packet search conditions for IPv4 is stored in one entry area and each of packet search conditions for IPv6 is stored in two entry areas, the packet search conditions for IPv6 include a first search condition, a second search condition, and a third search condition which respectively correspond to a first parameter, a second parameter, and a third parameter included in a communication parameter of an IPv6 packet, the first search condition and the third search condition are stored in an even-numbered entry area of the two entry areas, and the second search condition and the third search condition are stored in an odd-numbered entry area of the two entry areas, and the search processing unit compares each of the packet search conditions for IPv4 or each of the packet search conditions for IPv6 with the communication parameter of the received packet depending on whether the received packet is an IPv4 packet or the IPv6 packet.

Thereby, each packet search condition for IPv4 stored in one entry area is compared with the communication parameter of the received IPv4 packet, or each of packet search conditions for IPv6 stored in two entry areas is compared with the communication parameter of the received IPv6 packet, depending on whether the IPv4 packet is received or the IPv6 packet is received. In the case of the IPv6 packet, the set of the first parameter and the third parameter is compared with the set of the first search condition and the third search condition stored in the even-numbered entry area, and the set of the second parameter and the third parameter is compared with the set of the second search condition and the third search condition stored in the odd-numbered entry area. Therefore, in an environment in which IPv4 packets and IPv6 packets are mixed, the packet search conditions for IPv4 and the packet search conditions for IPv6 can be stored in the same search table. For this reason, as compared with the case in which a search table for the IPv4 packets and a search table for the IPv6 packets are individually provided, the entire memory capacity of the search table can be decreased and the memory capacity of the search table can be optimized.

In an eighth aspect, the search processing unit includes: a first comparing unit that compares the communication parameter of the received packet with a packet search condition of the even-numbered entry area and outputs a first comparison result; a second comparing unit that compares the communication parameter with the packet search condition of the odd-numbered entry area and outputs a second comparison result; and a determining unit that determines whether or not a packet search condition matching the communication parameter is searched for based on the first comparison result and the second comparison result, and, if the received packet is the IPv4 packet, the determining unit determines that the packet search condition matching the communication parameter is searched for if at least one of the first comparison result and the second comparison result indicates matching, and if the received packet is the IPv6 packet, the first comparing unit compares the packet search condition of the even-numbered entry area with a set of the first parameter and the third parameter, and compares the packet search condition of the even-numbered entry area with a set of the second parameter and the third parameter, the second comparing unit compares the packet search condition of the odd-numbered entry area with the set of the first parameter and the third parameter, and compares the packet search condition of the odd-numbered entry area with the set of the second parameter and the third parameter, and the determining unit determines that the packet search condition matching the communication parameter is searched for if the packet search condition of the even-numbered entry area matches the set of the first parameter and the third parameter and the packet search condition of the odd-numbered entry area matches the set of the second parameter and the third parameter, or if the packet search condition of the odd-numbered entry area matches the set of the first parameter and the third parameter and the packet search condition of the even-numbered entry area matches the set of the second parameter and the third parameter.

Thereby, when the IPv4 packet is received, it is determined that the packet search condition matching the communication parameter is searched for if the communication parameter of the received packet matches the packet search condition of the even-numbered entry area or the communication parameter matches the packet search condition of the odd-numbered entry area. In addition, when the IPv6 packet is received, it is determined that the packet search condition matching the communication parameter is searched for if the packet search condition of the even-numbered entry area matches the set of the first parameter and the third parameter and the packet search condition of the odd-numbered entry area matches the set of the second parameter and the third parameter or if the packet search condition of the odd-numbered entry area matches the set of the first parameter and the third parameter and the packet search condition of the even-numbered entry area matches the set of the second parameter and the third parameter. Therefore, even when the IPv4 packets and the IPv6 packets are mixed, the search table can be searched while a common circuit is used for the IPv4 packets and the IPv6 packets. Furthermore, because the search with respect to the even-numbered entry area and the search with respect to the odd-numbered entry area are performed in parallel, the high-speed search can be achieved.

Moreover, another aspect of the present invention is a packet transfer processing method that corresponds to the above-described packet transfer processing device.

Furthermore, yet another aspect of the present invention is a packet transfer processing program for causing a computer to execute the packet transfer processing method.

Advantageous Effects of the Invention

That is, in accordance with the present invention, a control unit can reliably and efficiently detect the end of a communication period. Thereby, it is possible to provide a packet transfer processing device, a packet transfer processing method, and a packet transfer processing program that can effectively manage validity/invalidity of search rules in a search table and effectively use limited entry areas of the search table.

BRIEF DESCRIPTION OF THE DRAWINGS

FIG. 6B is a block diagram showing a first configuration example of the searching unit and the search table of the packet transfer processing device when a FIFO memory is provided in the searching unit shown in FIG. 1.

FIG. 7A is a diagram showing a first configuration example of an entry search table in a second embodiment of the present invention.

FIG. 7B is a diagram showing a second configuration example of the entry search table in the second embodiment of the present invention.

FIG. 8 is a diagram showing a third configuration example of the entry search table in the second embodiment of the present invention.

MODES FOR CARRYING OUT THE INVENTION

Hereinafter, embodiments of the present invention will be described with reference to the drawings.

(First Embodiment)

Figure 1:
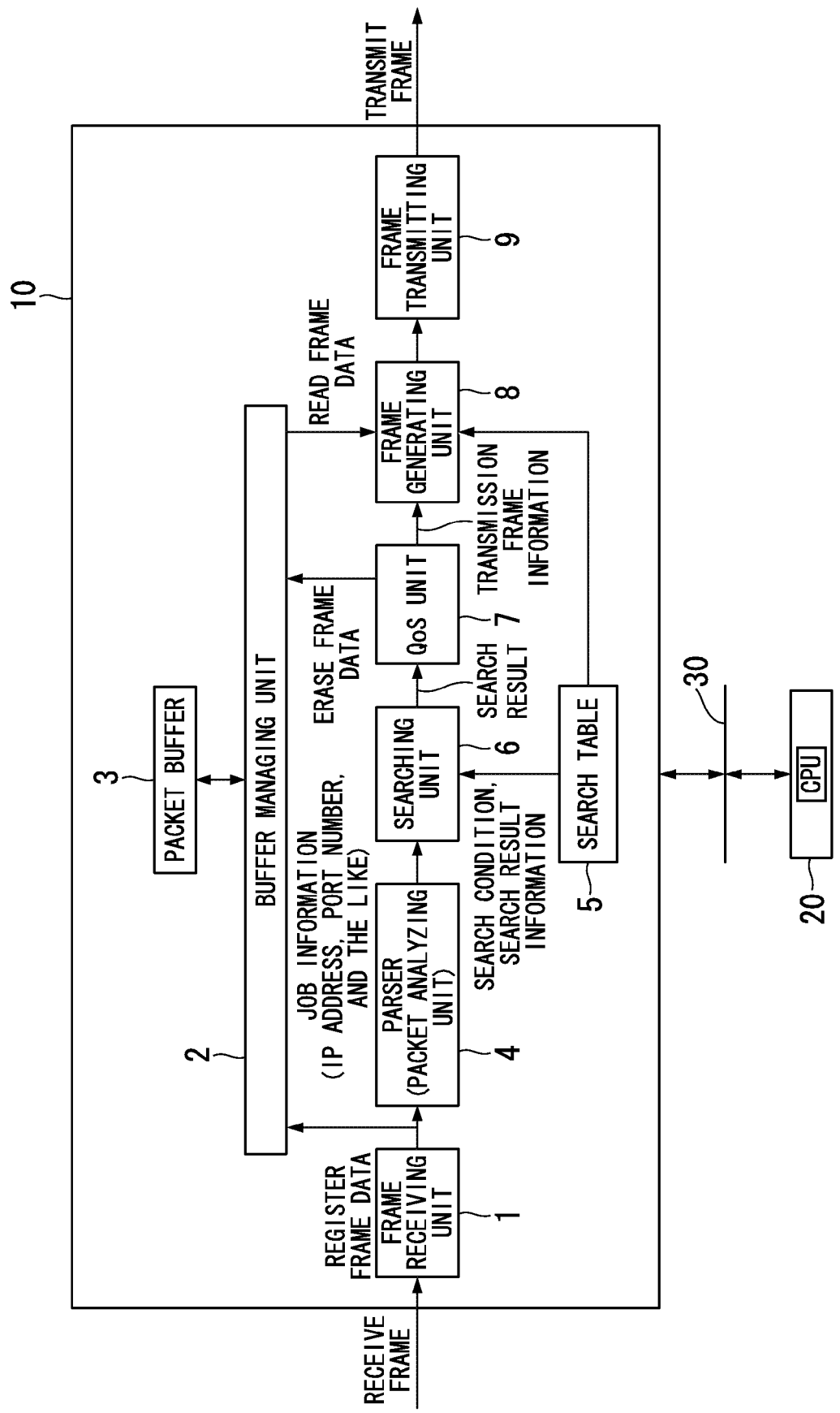
FIG. 1 is a block diagram showing a configuration of a packet transfer processing device in accordance with a first embodiment of the present invention.

FIG. 1 is a block diagram showing a configuration of a packet transfer processing device in accordance with a first embodiment of the present invention. This packet transfer processing device is provided with a packet transfer unit 10 and a control unit 20 including a central processing unit (CPU) that is connected to the packet transfer unit 10 through a bus 30.

The packet transfer unit 10 is provided with a frame receiving unit 1, a buffer managing unit 2, a packet buffer 3, a parser 4, a search table 5, a searching unit 6, a quality of service (QoS) unit 7, a frame generating unit 8, and a frame transmitting unit 9. It is to be noted that these processing units are integrated and the packet transfer unit 10 is configured using one large scale integration (LSI).

The packet transfer unit 10 receives reception packets input from a receiving interface not shown in the drawings by the frame receiving unit 1 for each frame, stores the received packets in the packet buffer 3 through the buffer managing unit 2, and supplies them to the parser 4. The parser 4 analyzes a header of a supplied received packet and supplies, to the searching unit 6, communication parameters inserted in the header, that is, parameters used by the searching unit 6, such as a source IP address, a destination IP address, a source port number, a destination port number, and a protocol, as JOB information.

The searching unit 6 sequentially compares the communication parameters of the received packet supplied as the JOB information from the parser 4 with a plurality of search conditions (packet search conditions) previously stored in the search table 5, and if a search condition matching the communication parameters is found, the searching unit 6 reads information showing the search result corresponding to the search condition from the search table 5 and supplies the information to the QoS unit 7.

The QoS unit 7 determines whether the received packet is to be passed or to be dropped based on the supplied information showing the search result. As a result of the determination, if the received packet is to be dropped, the QoS unit 7 transmits an erasure instruction to the buffer managing unit 2 to discard the corresponding packet from the packet buffer 3, and erases the JOB information. In contrast, if the received packet is to be passed, the QoS unit 7 enqueues the JOB information in a queue not shown in the drawings in accordance with a quality class obtained from the JOB information. If the opportunity to transmit the packet is obtained by scheduling processing, the QoS unit 7 supplies transmission frame information to the frame generating unit 8. The frame generating unit 8 reads the relevant packet from the packet buffer 3 through the buffer managing unit 2, rewrites a media access control (MAC) address, an IP address, or the like of the header of the packet, and outputs the packet to the frame transmitting unit 9. The frame transmitting unit 9 outputs the supplied packet to a transmission-side line interface not shown in the drawings.

Figure 2:
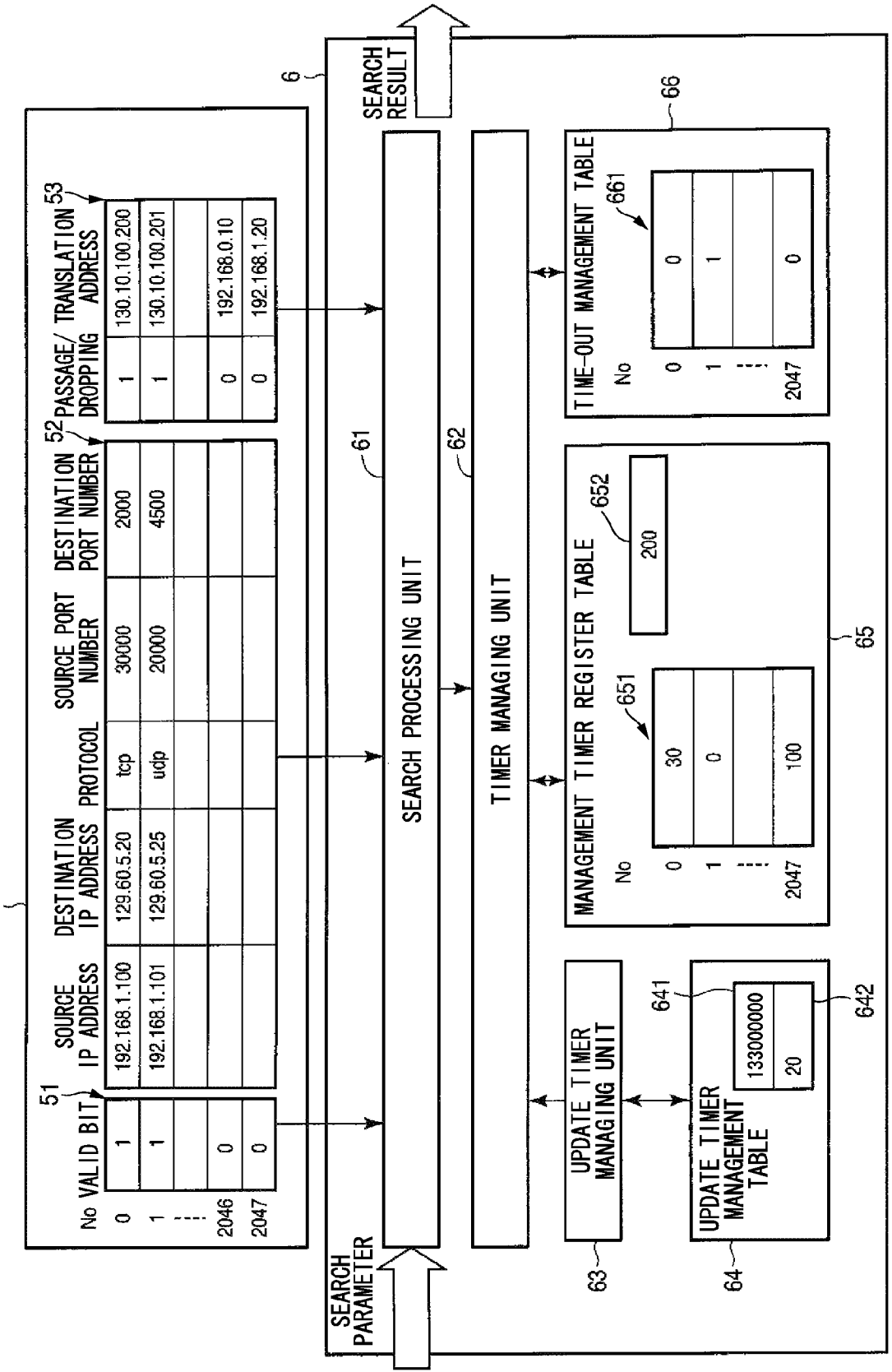
FIG. 2 is a block diagram showing configurations of a searching unit and a search table of the packet transfer processing device shown in FIG. 1.

By the way, the search table 5 and the searching unit 6 are configured as follows. FIG. 2 is a block diagram showing their configurations.

First, the search table 5 is provided with a validity management table 51, an entry search table 52, and an entry result table 53. The entry search table 52 has, for example, 2048 entry areas and search conditions are stored in these entry areas under control of the control unit 20.

For example, the search conditions are represented by a source IP address, a destination IP address, a source port number, a destination port number, a protocol such as a user datagram protocol (UDP) and a transmission control protocol (TCP), and the like, which are used for packet filtering, a network address port translation (NAPT) search, or a route cache search. It is to be noted that in addition to these, an IP address/port number to which a mask or a prefix is designated so as to be used for a route search, an Internet control message protocol (ICMP) code number, or presence or absence of fragment packet information may be used as a search condition. In brief, any information that identifies a packet may be applied.

It is to be noted that in order to facilitate the understanding protocols names (tcp and udp) that correspond to protocol numbers are indicated in the entry search table shown in FIG. 2; however, the protocol numbers are stored in actuality. This is the same in entry search tables shown in the drawings to be described below.

The validity management table 51 has 2048 valid bit areas that respectively correspond to the entry areas of the entry search table 52. In these valid bit areas, valid/invalid bits (valid/invalid flags) that show whether the search conditions stored in the entry areas of the entry search table 52 are valid or invalid are stored under the control of the control unit 20. FIG. 2 illustrates the case in which valid bits are shown as "1" and invalid bits are shown as "0."

The entry result table 53 is provided with 2048 passage/dropping bit areas and translation address areas so as to respectively correspond to the entry areas of the entry search table 52. The passage/dropping bit areas store passage/dropping bits for designating whether to pass or drop the packets. The translation address areas store translation addresses for translating an address in a header of a received packet when the received packet is passed. It is to be noted that processing for storing the passage/dropping bits and the translation addresses in the passage/dropping bit areas and the translation address areas is also executed under the control of the control unit 20.

Next, the searching unit 6 is provided with a search processing unit 61, a timer managing unit 62, an update timer managing unit 63, an update timer management table 64, a management timer register table 65, and a time-out management table 66.

The search processing unit 61 executes the processing including: sequentially comparing search conditions corresponding to valid bit areas in which the valid bit "1" is set on the validity management table 51 among the plurality of search conditions stored in the entry search table 52, with the communication parameters of the received packet; and if a search condition matching the communication parameters is found, reading and outputting the passage/dropping bit and the translation address corresponding to the search condition from the entry result table 53.

The update timer managing unit 63 counts a system clock using a counter 642 provided in the update timer management table 64 and outputs a decrement request to the timer managing unit 62 whenever its count value reaches a value stored in a timer value register 641 of the update timer management table 64.

The management timer register table 65 is provided with a management timer register 651 and a management timer threshold value register 652. In the management timer register 651, 2048 timer register areas that correspond to the entry areas of the entry search table 52 are provided, and count values of timers are stored in these timer register areas. The management timer threshold value register 652 stores a maximum count value (time-out value) of the timers.

The timer managing unit 62 uses the timers to monitor whether the search conditions stored in the entry search table 52 are being used, and has functions of executing the following processing.

(1) Processing of setting a maximum count value of the management timer threshold value register 652 in the timer register area corresponding to the search condition corresponding to the valid bit area when the valid bit "1" is set on the validity management table 51, and decrementing a count value of the timer register area whenever a decrement request is output from the update timer managing unit 63.

(2) Processing of restoring the count value of the timer register area to the maximum count value of the management timer threshold value register 652 when matching information showing that the communication parameters of the received packet match the search condition is transmitted from the search processing unit 61 during a period in which the decrement processing is executed, that is, during counting of the timer.

(3) Processing of determining a time-out if the matching information is not transmitted from the search processing unit 61 and the count value of the timer register area becomes "−1" during the period in which the decrement processing is executed, and setting a corresponding timer value of the management timer register 651 to "0", and storing information "1" showing the time-out in the corresponding entry time-out register 661 within the time-out management table 66.

Figure 3:
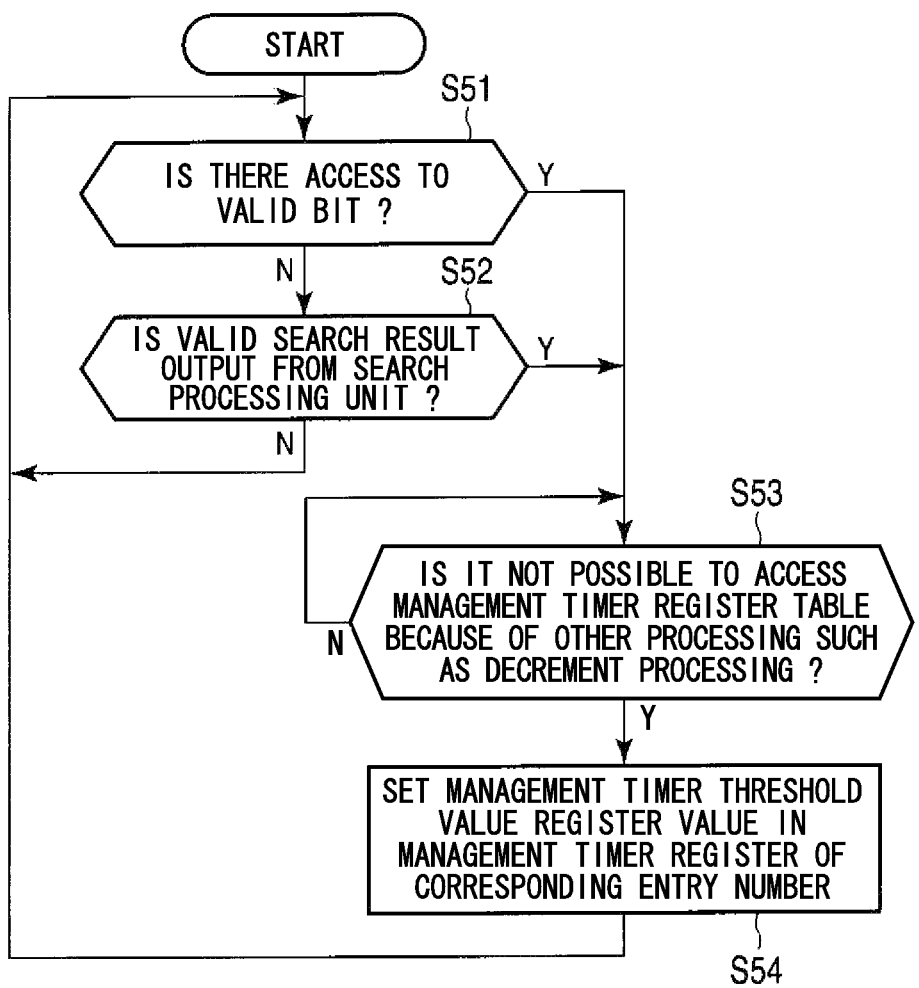
FIG. 3 is a flowchart showing a processing sequence and processing content when a timer managing unit shown in FIG. 2 holds valid bits of a validity management table.
Figure 4:
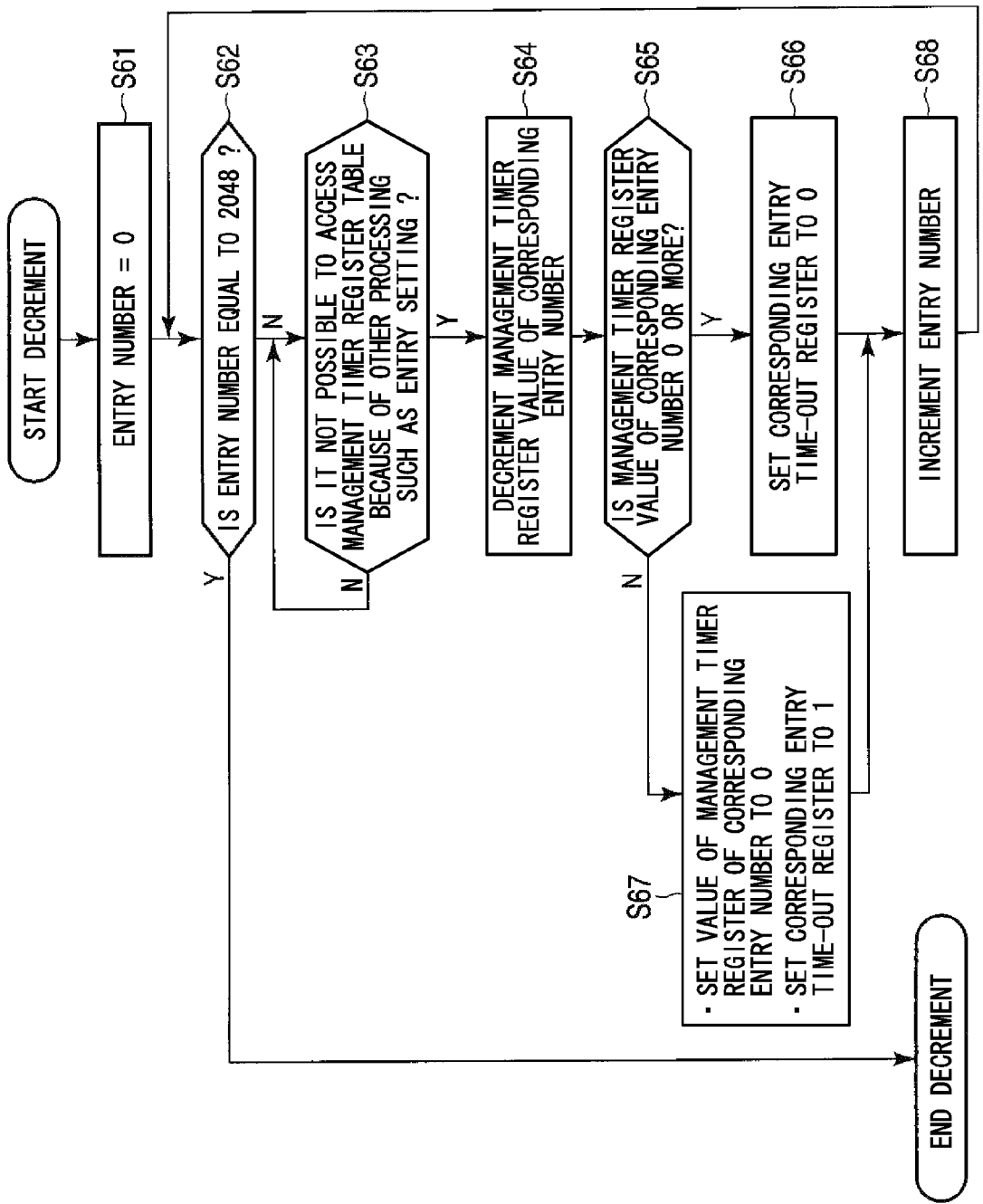
FIG. 4 is a flowchart showing a processing sequence and processing content when the timer managing unit shown in FIG. 2 changes a valid bit of the validity management table to an invalid bit.
Figure 5:
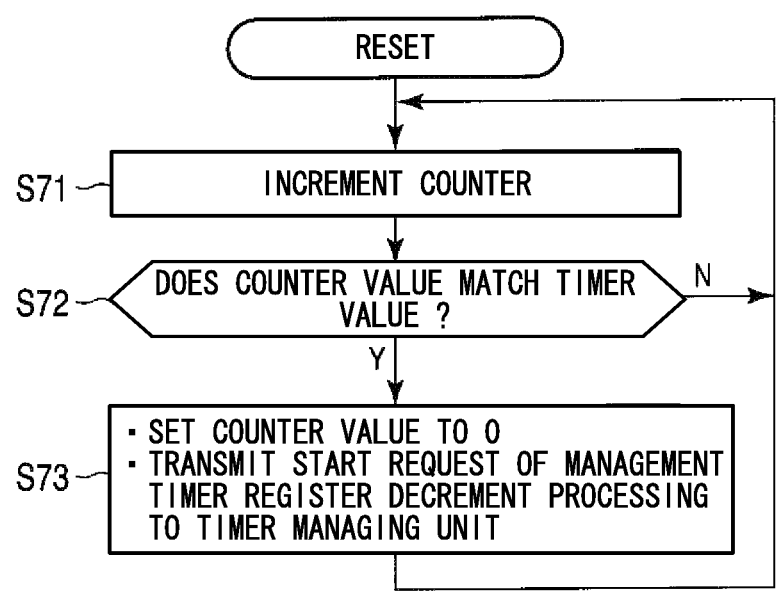
FIG. 5 is a flowchart showing a processing sequence and processing content to request bit change processing shown in FIG. 4 to start decrement.

Next, an operation of monitoring use situations of the search conditions by the packet transfer processing device configured as described above will be described. FIGS. 3 to 5 are flowcharts showing a processing sequence and processing content of the timer managing unit 62.

As shown in FIG. 3, in step S51, the timer managing unit 62 monitors access to a search condition for which the valid bit "1" is set in the corresponding valid bit area, and, in step S52, monitors an output of a valid search result from the search processing unit 61. In this state, it is assumed that "1" or "0" is written in the validity management table 51, when, for example, the communication starts, or the valid search result is transmitted from the search processing unit 61.

In that case, the timer managing unit 62 causes the processing to proceed to step S53, determines whether or not access to the management timer register table 65 is enabled, and, if the access is disabled, maintains a waiting state until the access is enabled. In this state, if the decrement processing of the timer value of the management timer register 651 or the like ends and the access to the management timer register table 65 is enabled, the timer managing unit 62 causes the processing to proceed to step S54 and sets the maximum count value of the management timer threshold value register 652, for example, "200" in FIG. 2, in the corresponding timer register area of the management timer register 651 as a timer value.

The setting of the timer value in the management timer register 651 described above is also performed when "1" or "0" is written in the validity management table 51 or the valid search result is transmitted from the search processing unit 61 during a counting period of the timer to be described below. That is, the timer restarts a counting operation from the beginning whenever "1" or "0" is written in the corresponding valid bit area of the validity management table 51 or the valid search result is transmitted from the search processing unit 61.

As shown in FIG. 5, first, the update timer managing unit 63 resets the counter 642, starts the count of the system clock using the counter 642 in step S71, and monitors whether or not a count value reaches the value stored in the timer value register 641 in step S72. Then, if the count value of the counter 642 reaches a timer value "133000000" of the timer value register 641, the update timer managing unit 63 outputs a decrement request to the timer managing unit 62 in step S73. Thereafter, the processing of steps S71 to S73 is repeated. Therefore, the decrement request is output from the update timer managing unit 63 at a time interval determined by the timer value and a cycle of the system clock. For example, if the system clock is 133 MHz and the timer value is "133000000", the decrement request is output from the update timer managing unit 63 every second.

The timer managing unit 62 executes the decrement processing of the timer value, that is, counting processing of the timer, as described below, whenever the decrement request is output from the update timer managing unit 63. That is, as shown in FIG. 4, first, the timer managing unit 62 initially sets an entry number of the management timer register 651 to "0" in step S61, and determines whether or not the entry number reaches "2048", which is a maximum value "2047"+1, in step S62.

Then, if the entry number does not reach "2048", which is the maximum value+1, in step S63, the timer managing unit 62 determines whether or not the access to the management timer register table 65 is enabled and if the access is disabled, the timer managing unit 62 maintains a waiting state until the access is enabled. In this state, if the processing of setting the maximum count value in the timer of the management timer register 651 or the like ends and the access to the management timer register table 65 is enabled, the timer managing unit 62 causes the processing to proceed to step S64 and decrements (−1) a count value, that is, a timer value, of a timer register area corresponding to an entry number "0" of the management timer register 651. Then, in step S65, the timer managing unit 62 determines whether or not the decremented count value is "0" or more. If the decrement count value is "0" or more, the timer managing unit 62 causes the processing to proceed to step S66 and stores "0" showing that counting is being performed in the area of the corresponding entry time-out register 661 of the time-out management table 66.

Thereafter, when the decrement processing of the timer corresponding to the entry number "0" ends, the timer managing unit 62 then increments (+1) the entry number in step S68 and returns the processing to step S62. Then, the decrement processing of the timer having the entry number "1" is executed by steps S62 to S66 and step S68. Thereafter, similarly, the timer managing unit 62 repetitively executes the decrement processing of the timer value corresponding to each entry number in steps S62 to S66 and step S68, until the entry number exceeds the maximum value "2047" in step S62. If the entry number exceeds "2047", the timer managing unit 62 ends the decrement processing.

Here, it is assumed that as a result of the decrement processing, the timer value that corresponds to an entry number becomes "4." When the timer managing unit 62 detects that the timer value becomes "−1" in step S65, the timer managing unit 62 regards it as the time-out, sets the corresponding timer value of the management timer register 651 to "0" in step S67, and stores information "1" showing that the timer times out in the corresponding entry time-out register 661 within the time-out management table 66.

The control unit 20 executes processing for changing the valid bit area of the validity management table 51 based on information stored in the entry time-out register 661 of the time-out management table 66, that is, information showing whether the timer is performing counting or times out. In addition, the control unit 20 executes processing for detecting an empty entry area from the entry search table 52 and setting a search condition for performing new communication in this empty entry area.

The following are two conceivable configurations and methods for detecting the empty entry area and for setting the search condition.

Figure 6A:
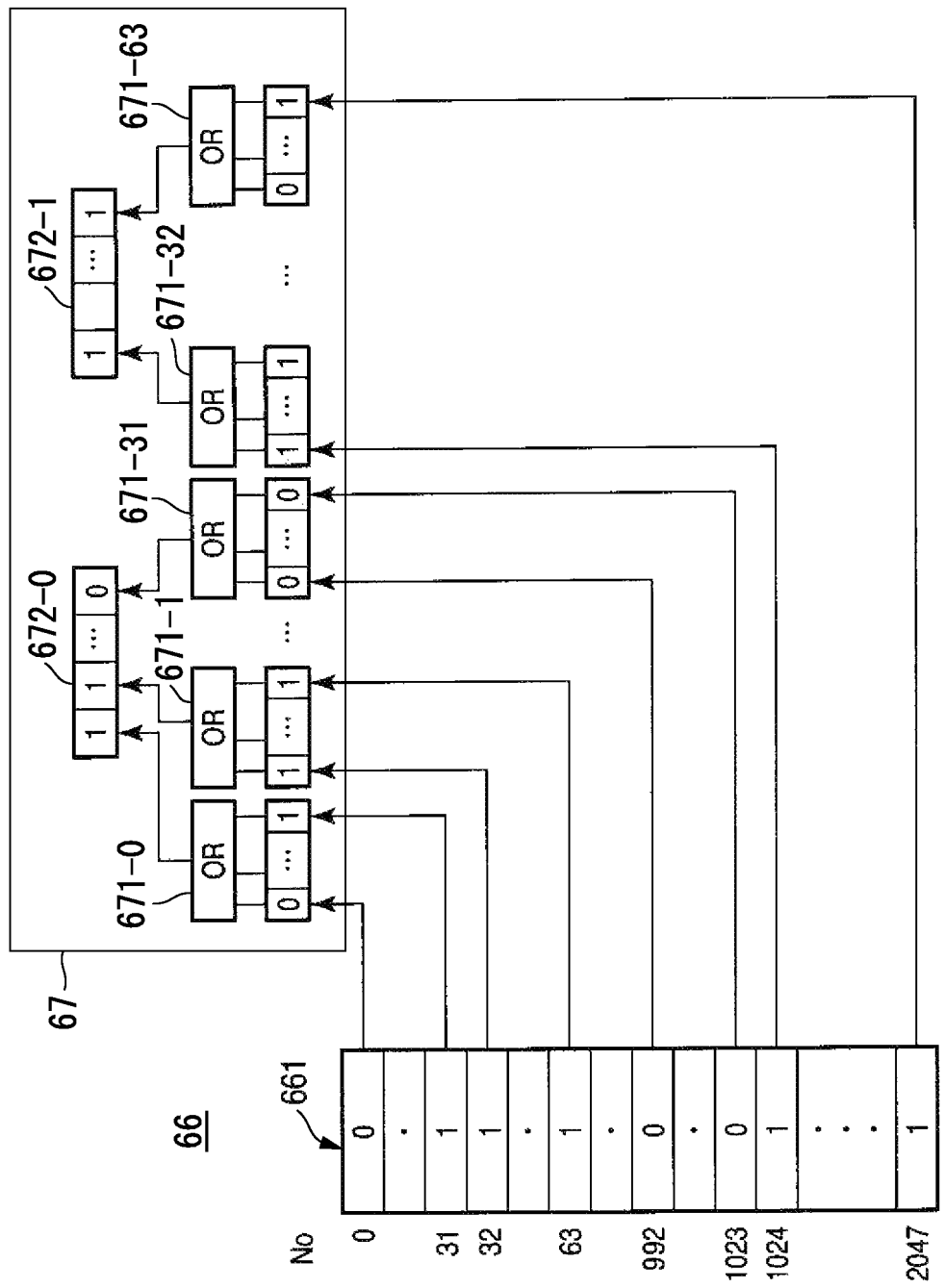
FIG. 6A is a diagram showing a configuration of a counting register provided in a time-out management table shown in FIG. 2 and an entry time-out register.

A first configuration and method are to provide a counting register in the time-out management table 66 and identify the empty entry area by the control unit 20 based on an output of the counting register. FIG. 6A is a circuit diagram showing a configuration of a counting register 67 in the above case and the entry time-out register 661.

That is, the 2048 bit areas of the entry time-out register 661 are divided into a plurality of groups, and OR circuits 671-0 to 671-63 (hereinafter, these are collectively referred to as the OR circuits 671) are provided for the respective groups. Each of the OR circuits 671 obtains bit data showing presence or absence of the time-out from the bit areas belonging to the corresponding group of the entry time-out register 661 and outputs OR data of these pieces of bit data. The OR circuits 671 are further divided into a plurality of blocks, and time-out aggregation registers 672-0 and 672-1 are provided for respective blocks. The time-out aggregation registers 672-0 and 672-1 store OR data output from the OR circuits 671-0 to 671-31 and the OR circuits 671-32 to 671-63 belonging to the corresponding blocks. At this time, in dividing the OR circuits 671 into the blocks, the number of bits of the OR data in each block is determined in accordance with an architecture of a CPU of the control unit 20. For example, if the CPU has a 32-bit architecture, the OR circuits 671 are divided such that 32 OR circuits 671 form one block.

The control unit 20 first reads the OR data of the 32 OR circuits 671-0 to 671-31 and the OR data of the 32 OR circuits 671-32 to 671-63 from the time-out aggregation registers 672-0 and 672-1 and determines whether or not a bit "1" showing that the timer times out is included in the OR data.

For example, the control unit 20 determines whether or not the value of each time-out aggregation register is "0." As a result of this determination, if a block including the bit "1" showing that the timer times out is found, the control unit 20 then identifies the bit position of the time-out bit "1" from the OR data and selects a group to which the identified bit position belongs. In addition, the control unit 20 reads the bit data from the bit areas of the entry time-out register 661 belonging to the selected group and detects the timed-out entry area as an empty entry area based on the read bit data.

The control unit 20 writes a search condition needed to perform new communication in the entry area detected as the empty entry area in the entry search table 52. In addition to this, the control unit 20 writes passage/dropping information and a translation address in areas corresponding to the entry area in the entry result table 53. Furthermore, the control unit 20 writes a valid bit "1" in a valid bit area corresponding to the entry area in the validity management table 51.

Figure 6C:
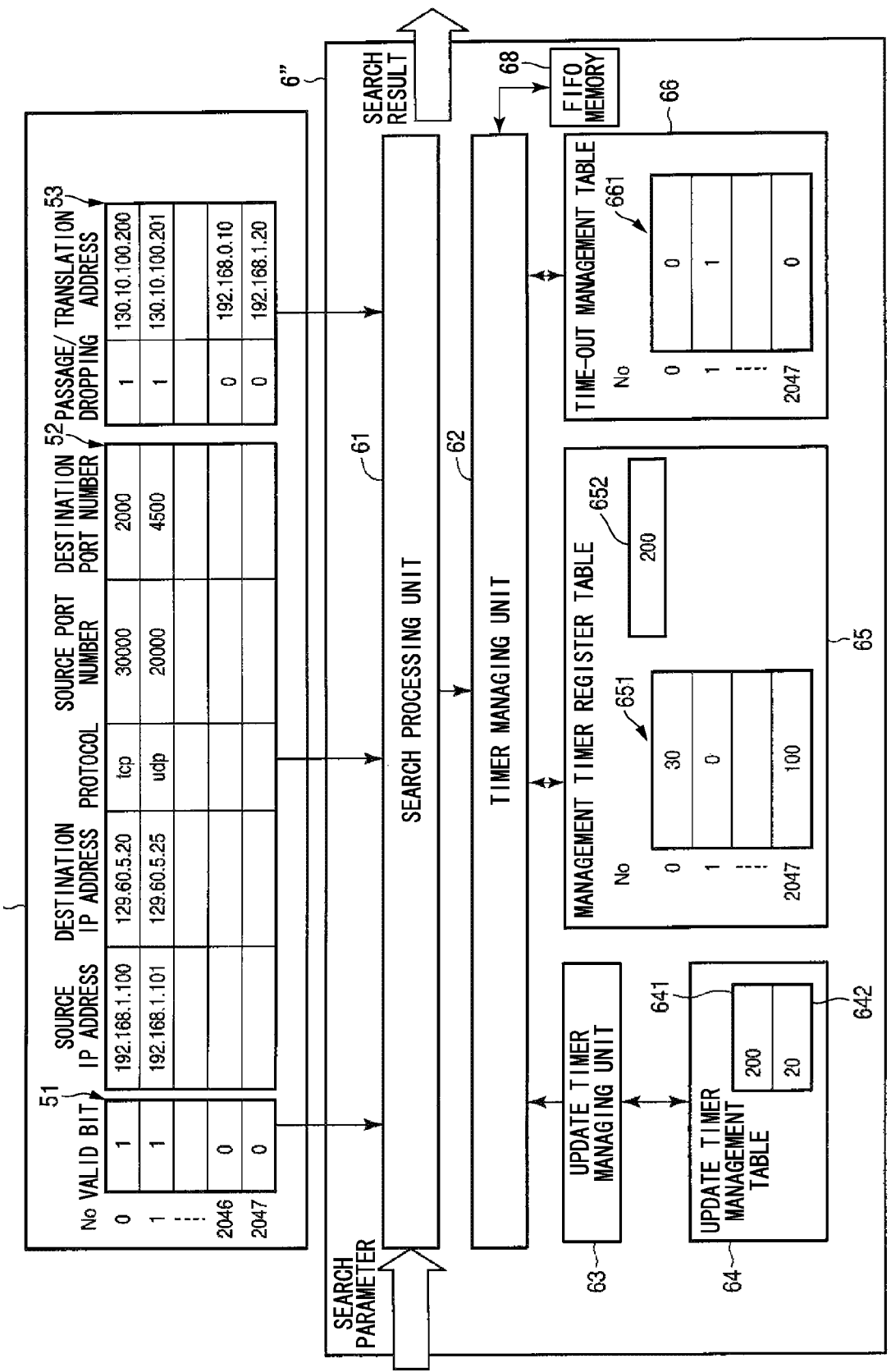
FIG. 6C is a block diagram showing a second configuration example of the searching unit and the search table of the packet transfer processing device when a FIFO memory is provided in the searching unit shown in FIG. 1.

A second configuration and method are to manage the numbers of entry areas corresponding to timed-out timers using a first-in first-out (FIFO) memory. That is, as shown in FIG. 6B, a FIFO memory 68 is provided in a time-out management table 66' of a searching unit 6'. Alternatively, as shown in FIG. 6C, the FIFO memory 68 is provided in a searching unit 6" separately from the time-out management table 66. Then, when a timer times out, the timer managing unit 62 stores the number (identification information) of the entry area corresponding to the timed-out timer in the FIFO memory 68.

In identifying an empty entry area, the control unit 20 reads the number of an entry area having an earlier storage order from the FIFO memory 68 and identifies the entry area shown by the read number as the empty entry area. The control unit 20 then writes a search condition needed to perform new communication in the entry area detected as the empty entry area within the entry search table 52. In addition to this, the control unit 20 writes passage/dropping information and a translation address to areas corresponding to the entry area in the entry result table 53. Furthermore, the control unit 20 writes a valid bit "1" in a valid bit area corresponding to the entry area within the validity management table 51.

As described in detail above, in this embodiment, a timer corresponding to each entry area of the entry search table 52 is provided in the management timer register 651 so as to monitor its used time. Then, the timer starts the counting operation whenever "1" or "0" is written in the validity management table 51 or the valid search result is transmitted from the search processing unit 61 under the control of the timer managing unit 62. Moreover, when the counting time of the timer exceeds the preset time-out time, information showing the time-out is stored in the corresponding register area of the time-out management table 66.

Therefore, the control unit 20 can identify the empty entry area in the entry search table 52 based on the information showing the time-out result stored in the time-out management table 66 when the communication starts and can store the search condition needed to perform the following communications in the detected empty entry area.

For this reason, even when the control unit 20 does not participate in packet transfer processing during a communication period, the control unit 20 can recognize an empty entry area in the entry search table 52 and can dynamically manage entries of search conditions in the entry search table 52. As a result, use efficiency of the entry areas of the entry search table 52 is improved and the memory capacity of the entry search table 52 can be decreased.

Moreover, in this embodiment, the aggregation register 67 is provided in the time-out management table 66, and the control unit 20 identifies the empty entry area based on the output of the aggregation register 67. For this reason, in identifying the empty entry area, the control unit 20 can perform refinement for identifying the empty entry area in two steps. Therefore, as compared with the case in which validity/invalidity is determined sequentially with respect to all the entry areas of the entry search table 52, processing steps and a time that are needed to identify the empty entry area can be greatly decreased. For example, when the entry search table is provided with 2048 entry areas, conventionally, processing of a maximum of 64 (searching for a non-zero 32-bit register)+32 (searching bits in the non-zero 32-bit register)=96 steps are needed in order to search for the timed-out entry area. In contrast, in accordance with this embodiment, the number of steps needed for the processing can be decreased to 1+32+32=65 steps.

Furthermore, when the numbers of the entry areas corresponding to the timed-out timers are managed using the FIFO memory 68, the control unit 20 can identify the empty entry area simply and in a short time, by only reading the number of the entry area from the FIFO memory 68 without executing the processing for searching for the empty entry area.

(Second Embodiment)

Next, an embodiment to decrease the memory capacity of the entry search table will be described as a second embodiment of the present invention. In the second embodiment, searching processing with respect to the entry search table when network address port translation (NAPT) or packet filtering is performed is executed by bidirectional search.

FIG. 7A shows a configuration example of the entry search table that supports the bidirectional search. It is to be noted that it is assumed here that packets are transferred between two interfaces, and these interfaces are referred to as an interface 0 and an interface 1. Moreover, also in this embodiment, the reference numerals shown in FIG. 2 are used to describe the entry search table or the like.

When a search condition matching communication parameters of a packet received by the interface 0 is searched for from the entry search table 52, the search processing unit 61 compares the destination IP address/source IP address/destination port number/source port number/protocol number included in a header of the received packet with IP address 0/IP address 1/port number 0/port number 1/protocol number stored as the search conditions in the entry areas of the entry search table 52.

When the search condition is used to perform packet filtering or packet classification, the QoS unit 7 performs processing such as passage/dropping/classification on the received packet, in accordance with contents of the entry result table 53 associated with the search condition matching the communication parameters.

In the case of the NAPT, the IP address 2/IP address 3/port number 2/port number 3 are used as the destination IP address/source IP address/destination port number/source port number after the NAPT translation.

In contrast, when a search condition matching communication parameters of a packet received by the interface 1 is searched for, the search processing unit 61 compares the destination IP address/source IP address/destination port number/source port number/protocol number included in the header of the received packet with IP address 3/IP address 2/port number 3/port number 2/protocol number stored as the search conditions in the entry search table 52. In addition, the QoS unit 7 determines processing on the received packet, in accordance with passage/dropping information stored in the entry result table 53 to be associated with the search condition matching the communication parameters.

In the case of the NAPT, the IP address 1/IP address 0/port number 1/port number 0 are used as the destination IP address/source IP address/destination port number/source port number after the NAPT translation.

As such, the entry areas of the entry search table 52 are decreased by performing the bidirectional search on the search conditions stored in the entry areas of the entry search table 52. Thereby, the memory capacity of the entry search table 52 can be decreased.

FIG. 7B shows a configuration of the entry search table for further decreasing the memory capacity of the entry search table 52.

When a search condition matching communication parameters included in a header of a packet received by the interface 0 is searched for from the entry search table 52, the search processing unit 61 compares the destination IP address/source IP address/destination port number/source port number/protocol number included in the header of the received packet with IP address 1/IP address 0/port number 1/port number 0/protocol number stored as the search conditions in the entry search table 52.

Also in this case, similar to the case of FIG. 7A described above, the QoS unit 7 determines an operation of the received packet in accordance with passage/dropping information stored in the entry result table 53 associated with the search condition matching the communication parameters.

In the case of the NAPT, IP address 2/port number 2 are used as the destination IP address/destination port number after the NAPT translation.

In contrast, when a search condition matching communication parameters included in a header of a packet received by the interface 1 is searched for from the entry search table 52, the search processing unit 61 compares destination IP address/source IP address/destination port number/source port number/protocol number included as the communication parameters in the header of the received packet with the IP address 0/IP address 2/port number 0/port number 2/protocol number stored as the search conditions in the entry search table 52. Also in this case, similar to the case of FIG. 7A described above, the QoS unit 7 determines an operation of the received packet in accordance with passage/dropping information stored in the entry result table 53 associated with the search condition matching the communication parameters.

In the case of the NAPT, IP address 1/port number 1 are used as the source IP address/source port number after the NAPT translation.

By doing so, the entry areas of the entry search table 52 are further decreased, and thus the memory capacity can be decreased.

It is to be noted that the entry search table 52 can be searched without determining the interface by which a packet is received.

For example, destination IP address/source IP address/destination port number/source port number/protocol number inserted as the communication parameters into the header of the received packet are compared with a search condition A (IP address 0/IP address 1/port number 0/port number 1/protocol number of the entry search table 52) and a search condition B (IP address 3/IP address 2/port number 3/port number 2/protocol number of the entry search table 52).

When a search is performed using the above-described search conditions to perform the packet filtering or the packet classification, if the communication parameters of the received packet match any of the search conditions, the QoS unit 7 performs passage/dropping/classification in accordance with passage/dropping information stored in the entry result table 53 associated with the matching search conditions.

In the case of the NAPT, information for rewriting the packet is changed depending on the search condition matching the communication parameters. For example, if the communication parameters match the search condition A, the IP address 2/IP address 3/port number 2/port number 3 are used as the destination IP address/source IP address/destination port number/source port number after the NAPT translation. In addition, if the communication parameters match the search condition B, the IP address 1/IP address 0/port number 1/port number 0 are used as the destination IP address/source IP address/destination port number/source port number after the NAPT translation.

These all increase the circuit scale of the comparing units that compare the communication parameters with the search condition. However, because the number of search rules (total number of entries of the entry search table 52) can be decreased to ½, these are particularly effective when the number of needed search conditions is large.

The above description is directed to the case of IPv4, and the two entry areas are used to store the two search conditions (refer to an entry search table for IPv4 shown at the upper side of FIG. 8).

In contrast, in the case of IPv6, the length of an address to be designated is very long. In this case, the memory capacity of the entry search table 52 can be decreased by using two entry areas.

For example, an entry search table for IPv6 is configured as shown at the lower side of FIG. 8. That is, a source IPv6 address and a destination IPv6 address are set using areas of the IP address 0/IP address 1/IP address 2/port number 0/port number 1 included in the two entry areas. Moreover, a source port number and a destination port number are set using areas of a port number 2 included in the two entry areas. Furthermore, protocol numbers are set using areas of the protocol number included in the two entry areas. Thereby, the source IPv6 address/destination IPv6 address/source port number/destination port number/protocol number of an IPv6 packet can be set.

In the example described above, both of the entry areas include the same protocol number. However, if the source IPv6 address/destination IPv6 address, the source port number/destination port number, and the protocol number are set using one entry area in accordance with the setting (allocation of the addresses or the like) used in the case of IPv4, the areas that are not used in the entry search table increase. As compared with this, even when both of the entry areas have the same protocol number, the entry search table can be effectively used.

In addition, as a means for searching the entry search table for IPv6, the following configuration is conceivable. That is, the search condition for IPv4 or the search condition for IPv6 is designated for each search condition. In the case of the IPv4 packets, the search processing is executed as described above. When the high-speed search is performed, a plurality of circuits that compare the communication parameters of the packets with the search condition are usually used.

Figure 9:
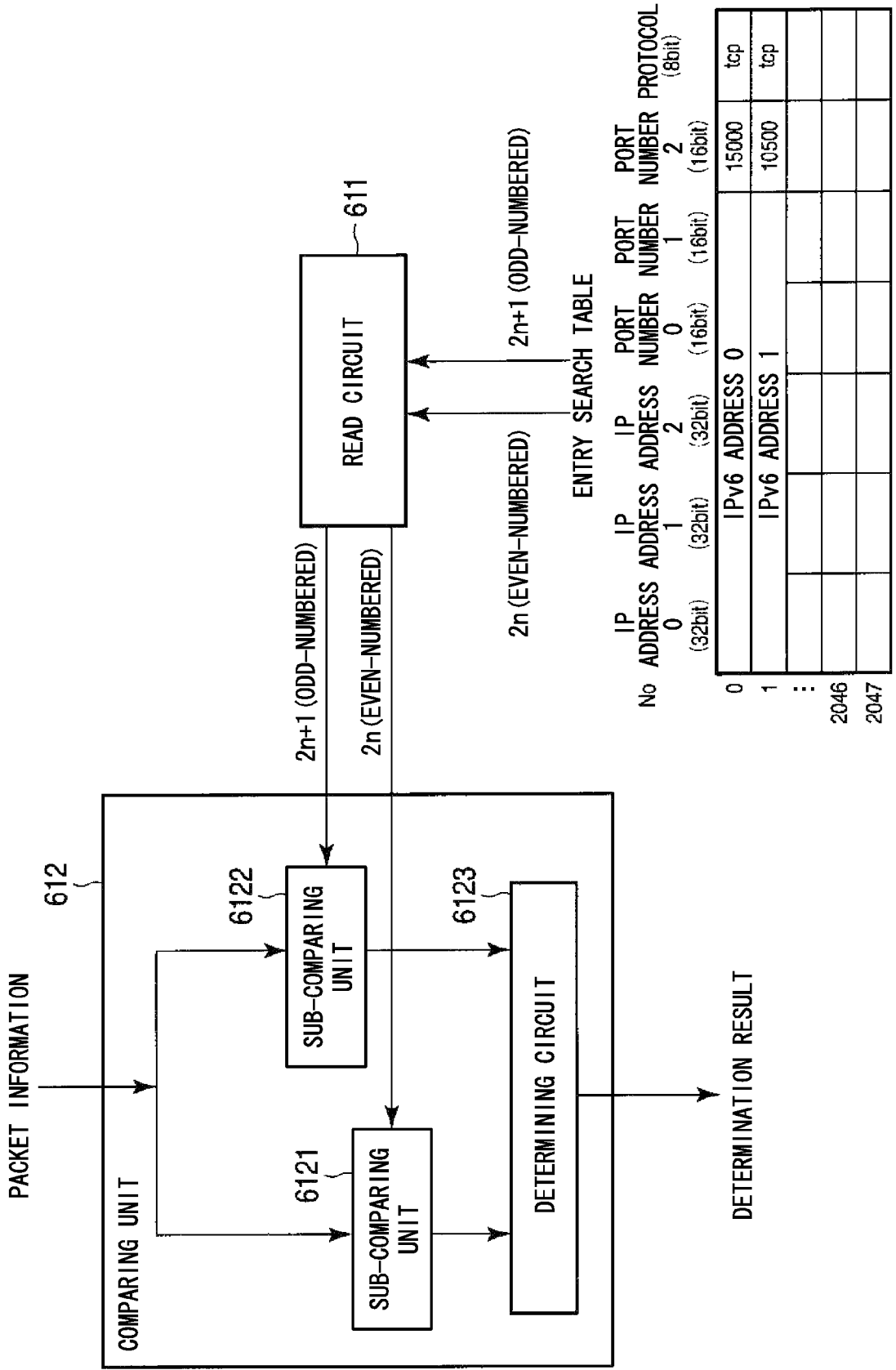
FIG. 9 is a diagram showing a configuration of a searching unit and a processing content when the search table shown in FIG. 8 is used.

For example, as shown in FIG. 9, in the searching unit 6, a read circuit 611 reads an even-numbered search condition and an odd-numbered search condition from the entry search table and supplied them to sub-comparing units 6121 and 6122 in a comparing unit 612. By doing so, processes of comparing the communication parameters of the packets with the search condition are executed in parallel.

That is, in the sub-comparing unit 6121, the source IPv6 address and the destination IPv6 address of the received packet are compared with the IPv6 address 0 of the entry search table 52. Moreover, in the sub-comparing unit 6121, the source port number and the destination port number of the received packet are compared with the port number 2 of the entry search table 52. Furthermore, in the sub-comparing unit 6121, the protocol number of the received packet is compared with the protocol number of the entry search table 52. Likewise, in the sub-comparing unit 6122, the source IPv6 address and the destination IPv6 address of the received packet are compared with the IPv6 address 1 of the entry search table 52. Moreover, in the sub-comparing unit 6122, the source port number and the destination port number of the received packet are compared with the port number 2 of the entry search table 52. Furthermore, in the sub-comparing unit 6122, the protocol number of the received packet is compared with the protocol number of the entry search table 52.

Subsequently, these comparison results are input to a determination circuit 6123. In the case of the IPv4 packets, the determination circuit 6123 evaluates the comparison results of the sub-comparing unit 6121 and the sub-comparing unit 6122 independently. That is, if both the sub-comparing unit 6121 and the sub-comparing unit 6122 show that the search conditions do not match the communication parameters of the received packet, the determination circuit 6123 outputs the determination result showing a mismatches. If any one of the sub-comparing unit 6121 and the sub-comparing unit 6122 shows that the search condition matches the communication parameters of the received packet, the determination circuit 6123 outputs the determination result showing the even-numbered entry area or the odd-numbered entry area corresponding to the sub-comparing unit outputting the output result showing the matching. If both the sub-comparing unit 6121 and the sub-comparing unit 6122 show that the search conditions match the communication parameters of the received packet, the determination circuit 6123 outputs the determination result showing the even-numbered entry area or the odd-numbered entry area corresponding to the sub-comparing unit 6121 or the sub-comparing unit 6122, in accordance with the priorities of the search conditions.

In contrast, in the case of the IPv6 packets, if the destination IPv6 address/destination port number/protocol number of the received packet match the even-numbered search condition in the sub-comparing unit 6121 and the source IPv6 address/source port number/protocol number of the received packet match the odd-numbered search condition in the sub-comparing unit 6122, the determination circuit 6123 determines that the search conditions match the communication parameters of the received packet.

Likewise, if the source IPv6 address/source port number/protocol number of the received packet information match the even-numbered search condition in the sub-comparing unit 6121 and the destination IPv6 address/destination port number/protocol number of the received packet match the odd-numbered search condition in the sub-comparing unit 6122, the determination circuit 6123 determines that the search conditions match the communication parameters of the received packet. By such a configuration, even when the IPv6 packets and the IPv4 packets are mixed, the memory capacity of the entry search table 52 can be optimized.

(Other Embodiments)

Figure 10:
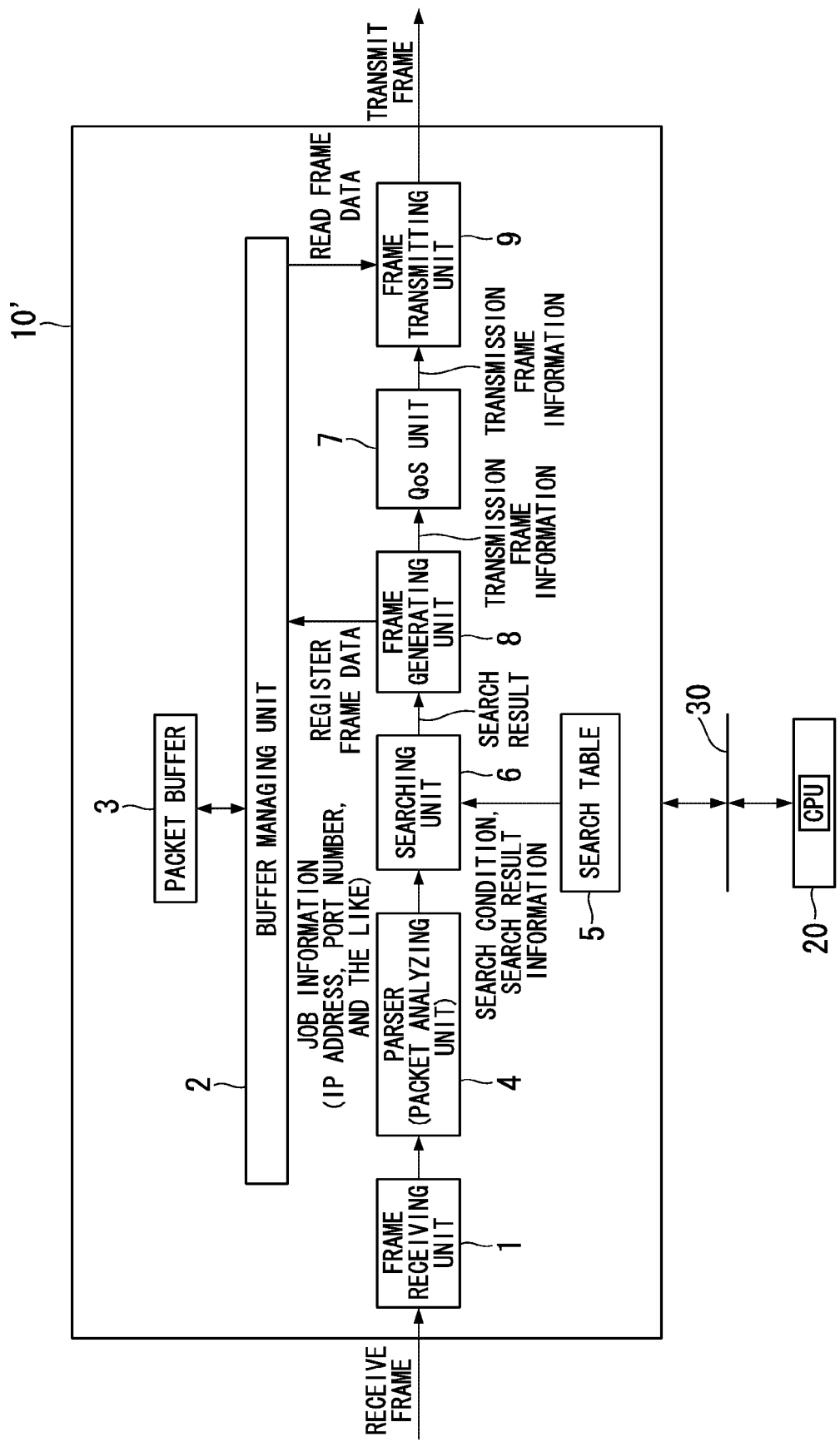
FIG. 10 is a block diagram showing a configuration of a packet transfer processing device in accordance with another embodiment of the present invention.

It is to be noted that the present invention is not limited to the embodiments described above. For example, as the configuration of the packet transfer unit 10, the search result output from the searching unit 6 may be supplied to the frame generating unit 8 and the transmission frame information output from the frame generating unit 8 may be supplied to the QoS unit 7, like a packet transfer unit 10' shown in FIG. 10.

In this case, a received packet received by the frame receiving unit 1 is transmitted to the frame generating unit 8 through the parser 4 and the searching unit 6. In addition, when the search result output from the searching unit 6 shows that the packet is to be dropped, the frame generating unit 8 drops the received packet. In contrast, when the search result does not show that the packet is to be dropped, the frame generating unit 8 executes, for example, processing for generating a packet obtained by rewriting the MAC address, the IP address, and the like of the header of the received packet. Next, the frame generating unit 8 stores the generated packet in the packet buffer 3 through the buffer managing unit 2 and outputs the transmission frame information to the QoS unit 7. By adopting the configuration described above, because the dropped packet does not need to be stored in the packet buffer 3, the packet buffer 3 can be used more effectively.

In addition, in the embodiments described above, the search result (passage/dropping bits and translation addresses) is output from the searching unit 6. However, it is acceptable that the searching unit 6 outputs an entry number, the frame generating unit 8 or the QoS unit 7 accesses the entry result table 53 in the search table 5, acquires the passage/dropping bit and the translation address corresponding to the entry number output from the searching unit 6, and outputs the acquired passage/dropping bit and translation address. Moreover, in the embodiments described above, the passage/dropping setting information and the translated address are output from the entry result table 53 as the information showing the search result. However, in addition to these, information showing "output from a specific interface", "dropping", "setting a quality class", and "rewriting an IP address and/or a port number" may be output. These pieces of information are transmitted to the frame generating unit 8 or the QoS unit 7, and the frame generating unit 8 or the QoS unit 7 performs an operation on the relevant packets.

It is to be noted that each unit that forms the packet transfer processing devices described above may be achieved using dedicated hardware; alternatively, its function may be achieved such that it is configured using a computer system including a memory and a CPU, and a program to achieve the processing of each unit is loaded on the memory and is executed. In addition, the program may be stored in a computer-readable storage medium and the program stored in the storage medium may be read and executed by the computer system.

The computer system referred to here includes an operating system and hardware such as peripheral devices. In addition, the computer-readable storage medium refers to a portable medium such as a flexible disk, a magneto optical disc, a read only memory (ROM), and a compact disc (CD)-ROM, or a storage device such as a hard disk embedded in the computer system. The program may be a program that achieves part of the functions described above. Alternatively, the program may be a so-called differential program, which is a program that can achieve the above-described functions in combination with a program already stored on the computer system.

In addition, various modifications can be made without departing from the gist of the present invention, with respect to the types and configurations of the tables provided in the search table, and the processing sequences and processing contents of the searching unit and the timer managing unit.

In brief, the present invention is not limited to the embodiments described above and the structural elements may be deformed and embodied in an implementation stage, without departing from the gist of the present invention. Moreover, various modifications may be made by appropriate combinations of the plurality of structural elements disclosed in the embodiments. For example, some structural elements may be removed from all the structural elements shown in each embodiment. Furthermore, the structural elements of different embodiments may be appropriately combined.

INDUSTRIAL APPLICABILITY

The present invention can be used, for example, in routers used in IP networks. In accordance with the present invention, the end of a communication period can be reliably and efficiently detected. Therefore, validity/invalidity of search rules in a search table can be effectively managed and limited entry areas of the search table can be effectively used.

DESCRIPTION OF REFERENCE NUMERALS

1: Frame receiving unit
2: Buffer managing unit
3: Packet buffer
4: Parser
5: Search table
6, 6', 6": Searching unit
7: QoS unit
8: Frame generating unit
9: Frame transmitting unit
10, 10': Packet transfer unit
20: Control unit
30: Bus
51: Validity management table
52: Entry search table
53: Entry result table
61: Search processing unit
62: Timer managing unit
611: Read circuit
612: Comparing unit
6121, 6122: Sub-comparing unit
6123: Determination circuit
63: Update timer managing unit
64: Update timer management table
641: Timer value register
642: Counter
65: Management timer register table
651: Management timer register
652: Management timer threshold value register
66, 66': Time-out management table
661: Entry time-out register
67: Aggregation register
671-0, 671-1, 671-31, 671-32, 671-63: OR circuit
672-0, 672-1: Time-out aggregation register
68: FIFO memory

The invention claimed is:

1. A packet transfer processing device comprising:
a search table that includes a plurality of entry areas to store a plurality of packet search conditions;
a search processing unit that, whenever a packet is received, compares a communication parameter of the received packet with the plurality of packet search conditions stored in the search table and outputs a search result corresponding to a packet search condition matching the communication parameter;
a transfer processing unit that executes processing for transferring or dropping the received packet based on the search result;
a validity management table that stores information for setting whether each packet search condition is valid or invalid, in association with each of the plurality of packet search conditions stored in the search table;
timers that correspond to the plurality of entry areas;
a timer managing unit that starts a counting operation by a timer whenever a packet in which a communication parameter matches a packet search condition corresponding to information on the validity management table that is set as valid is received or whenever the information is written in the validity management table;
a time-out management table that stores information indicating whether the timer is performing the counting operation or times out, for each timer;
a validity/invalidity managing unit that stores information indicating that the timer times out in the time-out management table and changes information corresponding to the timed-out timer among the information stored in the validity management table from validity to invalidity if a counting time of the timer exceeds a preset time-out time; and
a control unit that, when the communication starts, detects an empty entry area of the search table based on the information stored in the time-out management table and stores a packet search condition needed to perform the communication in the detected empty entry area.

2. The packet transfer processing device according to claim 1,
wherein the time-out management table comprises:
a time-out register that includes a plurality of bit areas that are provided to correspond to the entry areas of the search table and stores bit data indicating whether the timer is performing the counting operation or times out in a bit area corresponding to the timer among the plurality of bit areas;
a plurality of OR circuits that are provided to correspond to a plurality of groups obtained by dividing the plurality of bit areas of the time-out register and output OR data of the bit data stored in the plurality of bit areas included in each group; and
a plurality of aggregation registers that are provided to correspond to a plurality of blocks obtained by dividing the plurality of OR circuits by the number of bits which can be simultaneously processed by a processor of the control unit and store OR data output from OR circuits included in each block, and
in detecting the empty entry area, the control unit selects a block including a bit indicating that the timer times out based on the OR data stored in the aggregation registers, selects a group including a position of the bit indicating that the timer times out from the position of the bit indicating that the timer times out in the selected block, reads bit data from the bit areas of the time-out register belonging to the selected group, and detects an entry area corresponding to the timed-out timer based on the read bit data.

3. The packet transfer processing device according to claim 1, further comprising:
a memory that sequentially stores identification information of an entry area of the search table corresponding to the timed-out timer if the timer times out,
wherein, in detecting the empty entry area, the control unit reads the identification information of the entry area of an earlier storage order from the memory and sets the entry area indicated by the read identification information as the empty entry area.

4. The packet transfer processing device according to any one of claims 1 to 3,
wherein packets are transferred between a first interface and a second interface,
each of the packet search conditions stored in the search table includes a first search condition, a second search condition, and a third search condition,
if the received packet is a first packet received by the first interface, the search processing unit compares a communication parameter of the first packet with a set of the first search condition and the third search condition and outputs the search result if the communication parameter of the first packet matches the set of the first search condition and the third search condition, and
if the received packet is a second packet received by the second interface, the search processing unit compares a communication parameter of the second packet with a set of the second search condition and the third search condition and outputs the search result if the communication parameter of the second packet matches the set of the second search condition and the third search condition.

5. The packet transfer processing device according to claim 4,
wherein, if the received packet is the first packet, the search processing unit outputs the second search condition as a translated communication parameter obtained by performing a network address port translation on the first packet, and if the received packet is the second packet, the search processing unit outputs the first search condition as a translated communication parameter obtained by performing the network address port translation on the second packet.

6. The packet transfer processing device according to any one of claims 1 to 3,
wherein packets are transferred between a first interface and a second interface,
each of the packet search conditions stored in the search table includes a first search condition, a second search condition, and a third search condition, and
irrespective of whether the received packet is received by the first interface or by the second interface, the search processing unit compares a communication parameter of the received packet with a set of the first search condition and the third search condition, compares the communication parameter of the received packet with a set of the second search condition and the third search condition, and outputs the search result if the communication parameter matches the set of the first search condition and the third search condition or if the communication parameter matches the set of the second search condition and the third search condition.

7. The packet transfer processing device according to claim 6,
wherein, if the communication parameter of the received packet matches the set of the first search condition and the third search condition, the search processing unit outputs the second search condition as a translated communication parameter obtained by performing a network address port translation on the received packet, and if the communication parameter matches the set of the second search condition and the third search condition, the search processing unit outputs the first search condition as the translated communication parameter.

8. The packet transfer processing device according to any one of claims 1 to 3,
wherein, in the search table, each of packet search conditions for IPv4 is stored in one entry area and each of packet search conditions for IPv6 is stored in two entry areas,
the packet search conditions for IPv6 include a first search condition, a second search condition, and a third search condition which respectively correspond to a first parameter, a second parameter, and a third parameter included in a communication parameter of an IPv6 packet, the first search condition and the third search condition are stored in an even-numbered entry area of the two entry areas, and the second search condition and the third search condition are stored in an odd-numbered entry area of the two entry areas, and
the search processing unit compares each of the packet search conditions for IPv4 or each of the packet search conditions for IPv6 with the communication parameter of the received packet depending on whether the received packet is an IPv4 packet or the IPv6 packet.

9. The packet transfer processing device according to claim 8,
wherein the search processing unit comprises:
a first comparing unit that compares the communication parameter of the received packet with a packet search condition of the even-numbered entry area and outputs a first comparison result;
a second comparing unit that compares the communication parameter with the packet search condition of the odd-numbered entry area and outputs a second comparison result; and
a determining unit that determines whether or not a packet search condition matching the communication parameter is searched for based on the first comparison result and the second comparison result,
wherein, if the received packet is the IPv4 packet,
the determining unit determines that the packet search condition matching the communication parameter is searched for if at least one of the first comparison result and the second comparison result indicates matching, and if the received packet is the IPv6 packet,
the first comparing unit compares the packet search condition of the even-numbered entry area with a set of the first parameter and the third parameter, and compares the packet search condition of the even-numbered entry area with a set of the second parameter and the third parameter,
the second comparing unit compares the packet search condition of the odd-numbered entry area with the set of the first parameter and the third parameter, and compares the packet search condition of the odd-numbered entry area with the set of the second parameter and the third parameter, and
the determining unit determines that the packet search condition matching the communication parameter is searched for if the packet search condition of the even-numbered entry area matches the set of the first parameter and the third parameter and the packet search condition of the odd-numbered entry area matches the set of the second parameter and the third parameter, or if the packet search condition of the odd-numbered entry area matches the set of the first parameter and the third parameter and the packet search condition of the even-numbered entry area matches the set of the second parameter and the third parameter.

10. A packet transfer processing method comprising:
a search table storing step of storing a plurality of packet search conditions in a plurality of entry areas of a search table;
a search processing step of, whenever a packet is received, comparing a communication parameter of the received packet with the plurality of packet search conditions stored in the search table and outputting a search result corresponding to a packet search condition matching the communication parameter;
a transfer processing step of performing processing for transferring or dropping the received packet based on the search result;
a validity management table storing step of storing information for setting whether each packet search condition is valid or invalid in a validity management table in association with each of the plurality of packet search conditions stored in the search table;
a counting step of, for each of the plurality of entry areas, starting a counting operation by a corresponding timer whenever a packet in which a communication parameter matches a packet search condition corresponding to information on the validity management table that is set as valid is received or whenever the information is written in the validity management table;
a time-out management table storing step of storing information indicating that counting is in progress when the timer is performing the counting operation in a time-out management table and storing information indicating that the timer times out in the time-out management table if a counting time of the timer exceeds a preset time-out time;
a validity management table changing step of changing information corresponding to the timed-out timer among the information stored in the validity management table from validity to invalidity if the counting time of the timer exceeds the time-out time; and
a search condition storing step of, when a communication starts, detecting an empty entry area in the search table based on the information stored in the time-out management table and storing a packet search condition needed to perform the communication in the detected empty entry area.

11. The packet transfer processing method according to claim 10,
wherein the time-out management table storing step comprises:
a time-out register storing step of storing bit data indicating whether the timer is performing the counting operation or times out in a bit area corresponding to the timer among a plurality of bit areas of a time-out register that are provided to correspond to the respective entry areas of the search table;
an OR data calculating step of dividing the plurality of bit areas of the time-out register into a plurality of groups and calculating, for each group, OR data of bit data stored in a plurality of bit areas included in each group; and
an aggregation step of dividing a plurality of pieces of calculated OR data into a plurality of blocks by the number of bits which can be simultaneously processed by a processor and collectively storing, for each block, OR data included in each block in an aggregation register, and the search condition storing step comprises:
a block selecting step of, in detecting the empty entry area, selecting a block including a bit indicating that the timer times out based on the OR data stored in the aggregation register;
a group selecting step of selecting a group including a position of the bit indicating that timer times out from the position of the bit indicating that the timer times out in the selected block, and
an entry area detecting step of reading bit data from a bit area of the time-out register belonging to the selected group and detecting an entry area corresponding to the timed-out timer based on the read bit data.

12. The packet transfer processing method according to claim 10, further comprising:
an identification information storing step of sequentially storing identification information of an entry area of the search table corresponding to the timed-out timer in a memory when the timer times out,
wherein, in the search condition storing step, in detecting the empty entry area, the identification information of an entry area of an earlier storage order is read from the memory and the entry area indicated by the read identification information is set as the empty entry area.

13. A non-transitory computer readable medium storing a packet transfer processing program for causing a computer to execute a packet transfer processing method comprising the following steps:
a search table storing step of storing a plurality of packet search conditions in a plurality of entry areas of a search table;
a search processing step of, whenever a packet is received, comparing a communication parameter of the received packet with the plurality of packet search conditions stored in the search table and outputting a search result corresponding to a packet search condition matching the communication parameter;
a transfer processing step of performing processing for transferring or dropping the received packet based on the search result;
a validity management table storing step of storing information for setting whether each packet search condition is valid or invalid in a validity management table in association with each of the plurality of packet search conditions stored in the search table;
a counting step of, for each of the plurality of entry areas, starting a counting operation by a corresponding timer whenever a packet in which a communication parameter matches a packet search condition corresponding to information on the validity management table that is set as valid is received or whenever the information is written in the validity management table;
a time-out management table storing step of storing information indicating that counting is in progress when the timer is performing the counting operation in a time-out management table and storing information indicating that the timer times out in the time-out management table if a counting time of the timer exceeds a preset time-out time;
a validity management table changing step of changing information corresponding to the timed-out timer among the information stored in the validity management table from validity to invalidity if the counting time of the timer exceeds the time-out time; and a search condition storing step of, when a communication starts, detecting an empty entry area in the search table based on the information stored in the time-out management table and storing a packet search condition needed to perform the communication in the detected empty entry area.

14. The non-transitory computer readable medium according to claim 13, wherein the time-out management table storing step comprises:
- a time-out register storing step of storing bit data indicating whether the timer is performing the counting operation or times out in a bit area corresponding to the timer among a plurality of bit areas of a time-out register that are provided to correspond to the respective entry areas of the search table;
- an OR data calculating step of dividing the plurality of bit areas of the time-out register into a plurality of groups and calculating, for each group, OR data of bit data stored in a plurality of bit areas included in each group; and
- an aggregation step of dividing a plurality of pieces of calculated OR data into a plurality of blocks by the number of bits which can be simultaneously processed by a processor and collectively storing, for each block, OR data included in each block in an aggregation register, and the search condition storing step comprises:
- a block selecting step of, in detecting the empty entry area, selecting a block including a bit indicating that the timer times out based on the OR data stored in the aggregation register;
- a group selecting step of selecting a group including a position of the bit indicating that timer times out from the position of the bit indicating that the timer times out in the selected block, and
- an entry area detecting step of reading bit data from a bit area of the time-out register belonging to the selected group and detecting an entry area corresponding to the timed-out timer based on the read bit data.

15. The non-transitory computer readable medium according to claim 13, wherein the packet transfer processing method further comprises:
- an identification information storing step of sequentially storing identification information of an entry area of the search table corresponding to the timed-out timer in a memory when the timer times out,
- wherein, in the search condition storing step, in detecting the empty entry area, the identification information of an entry area of an earlier storage order is read from the memory and the entry area indicated by the read identification information is set as the empty entry area.

* * * * *